United States Patent [19]

Pannell

[11] Patent Number: 5,205,130
[45] Date of Patent: Apr. 27, 1993

[54] DUAL STAGE AC SYSTEM FOR RECREATIONAL VEHICLE

[76] Inventor: Bobby L. Pannell, P.O. Box 116968, Carrollton, Tex. 75007

[21] Appl. No.: 724,832

[22] Filed: Jul. 2, 1991

[51] Int. Cl.⁵ .............................................. F25B 27/00
[52] U.S. Cl. .................................. 62/236; 62/241; 62/134
[58] Field of Search .............. 62/61, 79, 134, 175, 62/236, 239, 241, 244

[56] References Cited

U.S. PATENT DOCUMENTS

| | | | |
|---|---|---|---|
| 1,887,224 | 11/1932 | Ward et al. | 62/236 |
| 3,007,321 | 11/1961 | Kroyer | 62/199 |
| 3,685,577 | 8/1972 | Goodgion et al. | 165/48 |
| 3,866,433 | 2/1975 | Krug | 62/239 |
| 3,866,439 | 2/1975 | Bussjager et al. | 62/504 |
| 3,885,398 | 5/1975 | Dawkins | 62/89 |
| 3,896,634 | 7/1975 | Nagele et al. | 62/408 |
| 4,105,064 | 8/1978 | Del Toro et al. | 165/29 |
| 4,201,065 | 5/1980 | Griffin | 62/510 |
| 4,353,409 | 10/1982 | Saunders et al. | 165/2 |
| 4,537,117 | 8/1985 | Cavestany et al. | 98/39.1 |
| 4,543,796 | 10/1985 | Han et al. | 62/160 |
| 4,628,702 | 12/1986 | Boxum | 62/244 |
| 4,641,502 | 2/1987 | Aldrich et al. | 62/244 |
| 4,720,983 | 1/1988 | Mintz | 62/259.1 |
| 4,741,178 | 5/1988 | Fujiu et al. | 62/525 |
| 5,056,330 | 10/1991 | Isobe et al. | 62/236 |

*Primary Examiner*—Albert J. Makay
*Assistant Examiner*—William C. Doerrler
*Attorney, Agent, or Firm*—Dennis T. Griggs

[57] ABSTRACT

The components of a compact, dual stage air conditioning system are assembled within a common housing in which an evaporator airflow passage is separated from a condenser airflow passage by an interior panel. Dual stage operation is provided by a pair of evaporator coils which are interleaved about a common evaporator core, and by a pair of condenser coils which are interleaved about a common condenser core. A control circuit automatically enables single stage operation when on-board generator power is applied, and automatically enables dual stage operation for increased cooling capacity when commercial utility power is available.

5 Claims, 3 Drawing Sheets

DUAL STAGE AC SYSTEM FOR RECREATIONAL VEHICLE

FIELD OF THE INVENTION

This invention relates generally to air conditioning systems, and in particular to a dual stage air conditioning system which is adapted for use in a recreational vehicle.

BACKGROUND OF THE INVENTION

As used herein, the term "recreational vehicle" is used broadly to refer to mobile homes, motor homes, travel trailers, fifth wheelers, recreational vans and the like. Air refrigeration and conditioning may be provided by a compressor/condenser/evaporator unit mounted internally or externally of such vehicles. The air conditioning unit for some recreational vehicles is mounted on the roof of the vehicle. An opening is made in the roof for delivering conditioned air from the evaporator coil of the air conditioner to the interior of the vehicle. Other recreational vehicles have a window mounted air conditioner unit or an internal floor mounted evaporator console with an external compressor/condenser.

The recreational van is a multiple purpose vehicle which is especially popular among couples and families with small children. It makes an excellent camping rig for weekends and short vacations. To overcome rising construction costs and fuel costs, the trend in van construction has been toward smaller van body sizes. Accordingly, the location and space for an air conditioning unit must be carefully planned and allocated in the construction of modern recreational vehicles.

DESCRIPTION OF THE PRIOR ART

Conventional recreational vehicles have an air conditioning system which is powered by an on-board auxiliary AC power generator. A power cable is provided for conducting AC operating power to the compressor/fan components from a commercial utility outlet when it is available. The current rating of the on-board AC power generator is sufficient to power the air conditioning system during travel, and when parked if commercial utility power is not available.

The capacity of conventional, single stage air conditioning systems is adequate under certain operating conditions, for example during early spring and late fall, but may not be adequate to provide comfortable air conditioning throughout most of the United States during the hot summer months. It is theoretically possible to install a large capacity air conditioning system and on-board power generator to provide adequate cooling during the entire summer season. However, because of space limitations, it has not been practical to install an auxiliary AC power generator having the KVA rating necessary to supply the higher operating power levels required by such large capacity compressors. Moreover, the space occupied by the large capacity compressor/condenser/evaporator unit displaces an unacceptable amount of living/storage space within the vehicle.

Consequently, conventional recreational vehicles carry only a single air conditioning compressor/evaporator/condenser unit which is powered from an on-board auxiliary AC power generator, or alternatively by available commercial utility power. In such recreational vehicles, the air conditioning units are operated at their rated BTU output level, even when connected to commercial utility power which could support operation at a higher, more comfortable operating level.

Air conditioning systems for mobile homes, recreational vehicles and the like are disclosed in the following U.S. Pat. Nos.:

| | |
|---|---|
| 3,007,321 | 3,685,577 |
| 3,866,439 | 3,896,634 |
| 4,537,117 | 4,628,702 |
| 4,641,502 | 4,720,983 |
| 4,741,178 | |

OBJECTS OF THE INVENTION

The principal object of the present invention is to provide an improved air conditioning system which is adapted for use in a recreational vehicle, with the system being operable in a single stage mode from an on-board auxiliary AC power generator during travel and during such times that commercial utility power is not available, and which is operable in a dual stage mode to provide increased refrigeration when commercial utility power is available.

A related object of the invention is to provide a control circuit for a dual stage air conditioning system which automatically enables single stage operation when on-board generator power is applied, and which automatically enables dual stage operation for increased cooling capacity when commercial utility power is applied.

Another object of the invention is to provide a compact dual stage air conditioning system for use in a recreational vehicle in which the space occupied by the compressors, evaporators, condensers and other refrigerant/airflow components is minimized.

SUMMARY OF THE INVENTION

The foregoing objects are achieved by a dual stage air conditioning system in which the dual stage components are assembled within a common housing in a compact arrangement which is adapted for installation in an equipment compartment beneath the floor of a recreational vehicle. Dual stage operation is provided by dual compressors, a pair of evaporator coils which are interleaved within a common evaporator unit, and by a pair of condenser coils which are interleaved within a common condenser unit. Outside air is directed across the interleaved condenser coils by a single fan. Likewise, return air is circulated from the interior of the recreational vehicle and is directed across the interleaved evaporator coils by a common blower fan. The dual stage components, including the compressors and interleaved condenser coils, are enclosed within a condenser airflow passage, while the evaporator blower fan and interleaved evaporator coils are enclosed within an evaporator airflow passage. The condenser airflow passage and the evaporator airflow passage are separated by an internal panel. The volume occupied by the dual stage air conditioning unit is minimized since the condenser coils are interleaved about a common condenser core, and the evaporator coils are interleaved about a common evaporator core. A single fan services both condenser coils, and a single blower fan services both evaporator coils, thereby conserving equipment space.

A control circuit automatically applies operating power to the evaporator fan, the condenser fan and the compressor of only one stage when power is applied from an on-board generator. The control circuit automatically applies AC operating power to the evaporator fan, the condenser fan and the compressors of both stages when operating power is applied from a utility outlet. AC operating power produced by an on-board generator is automatically applied only to a single stage by a first set of switching relays which are energized only when the on-board generator power circuit is active. AC operating power derived from a utility outlet is automatically applied to both stages by a second set of switching relays, with the operation of the first and second sets of switching relays being independent of each other.

Other features and advantages of the present invention will be appreciated by those skilled in the art upon reading the detailed description which follows with reference to the attached drawings.

DETAILED DESCRIPTION OF THE PREFERRED EMBODIMENT

Figure 1:
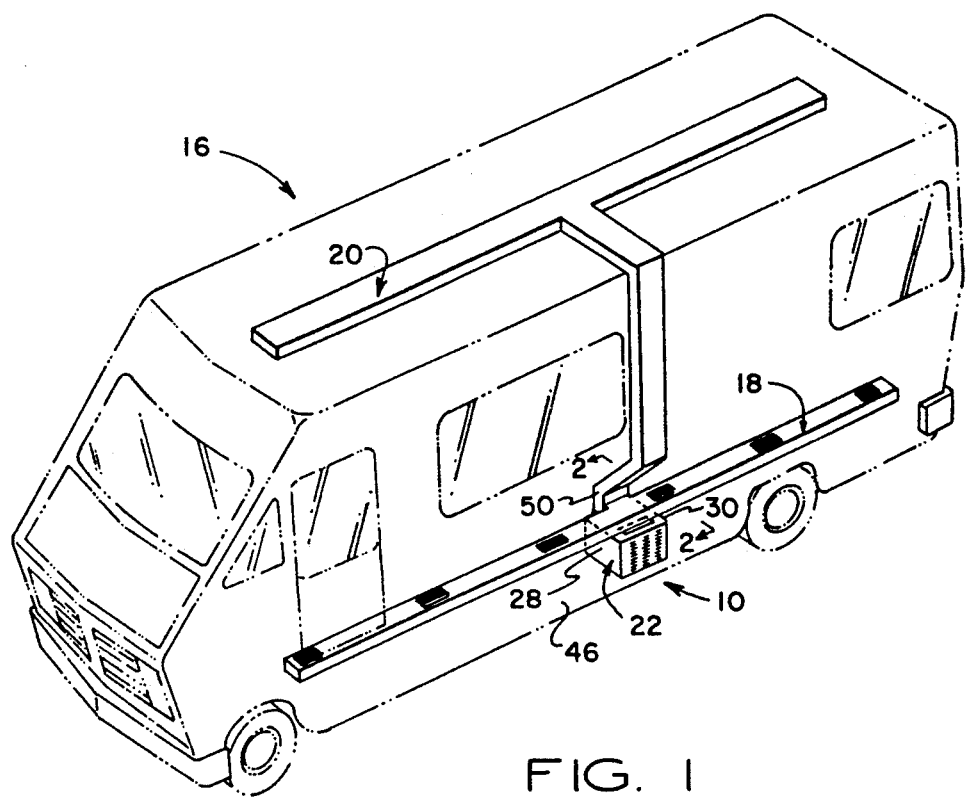
FIG. 1 is a perspective view of a recreational van in which the dual stage air conditioning system of the present invention has been installed.

In the description which follows, like parts are indicated throughout the specification and drawings with the same reference numerals, respectively. The figures are not drawn to scale, and the proportions of certain parts have been exaggerated for convenience of illustration.

Figure 2:
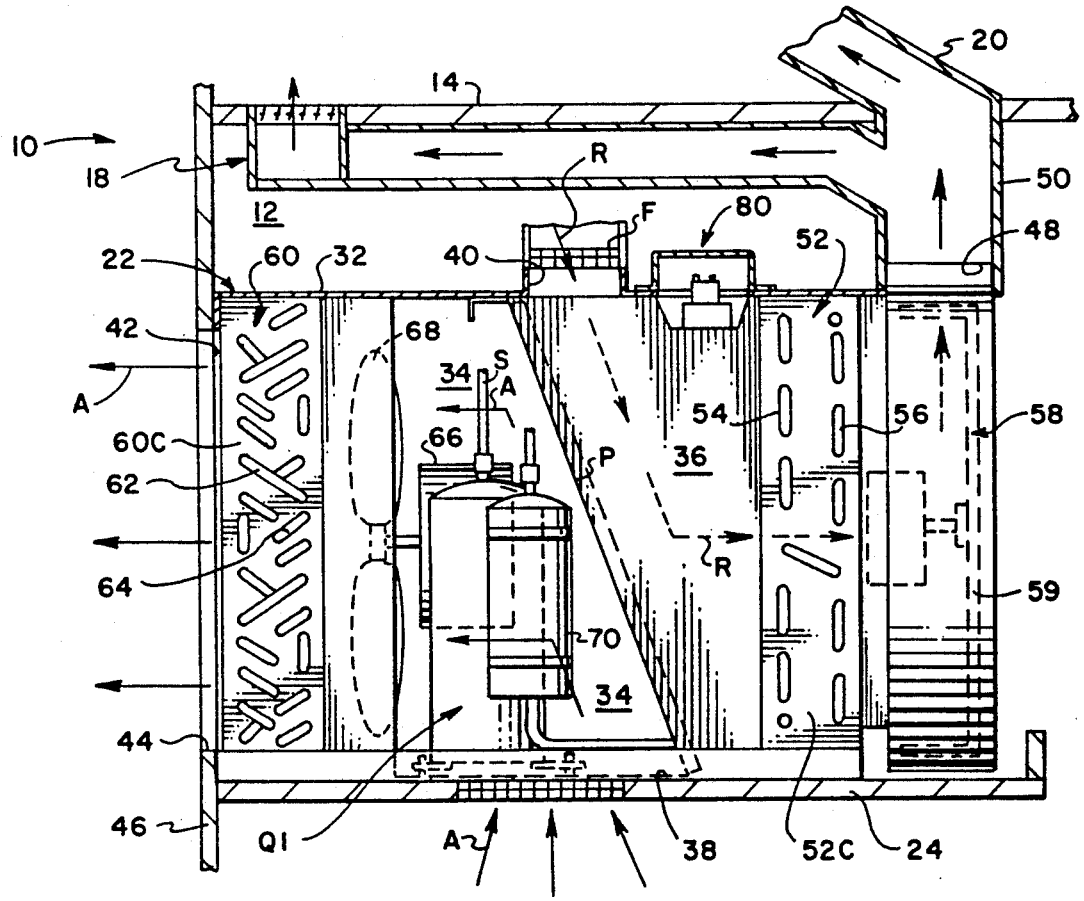
FIG. 2 is a sectional view of the dual stage air conditioning system taken along the line 2—2 of FIG. 1.

Referring now to FIG. 1 and FIG. 2, a dual stage air conditioning unit 10 is installed within an equipment compartment 12 beneath the floor 14 of a recreational vehicle 16. The air conditioning system 10 is comparable to a residential central air system which circulates refrigerated air into and out of the interior air space of the recreational vehicle 16 through a floor distribution duct 18 and an overhead ceiling distribution duct 20.

Figures 3, 4:
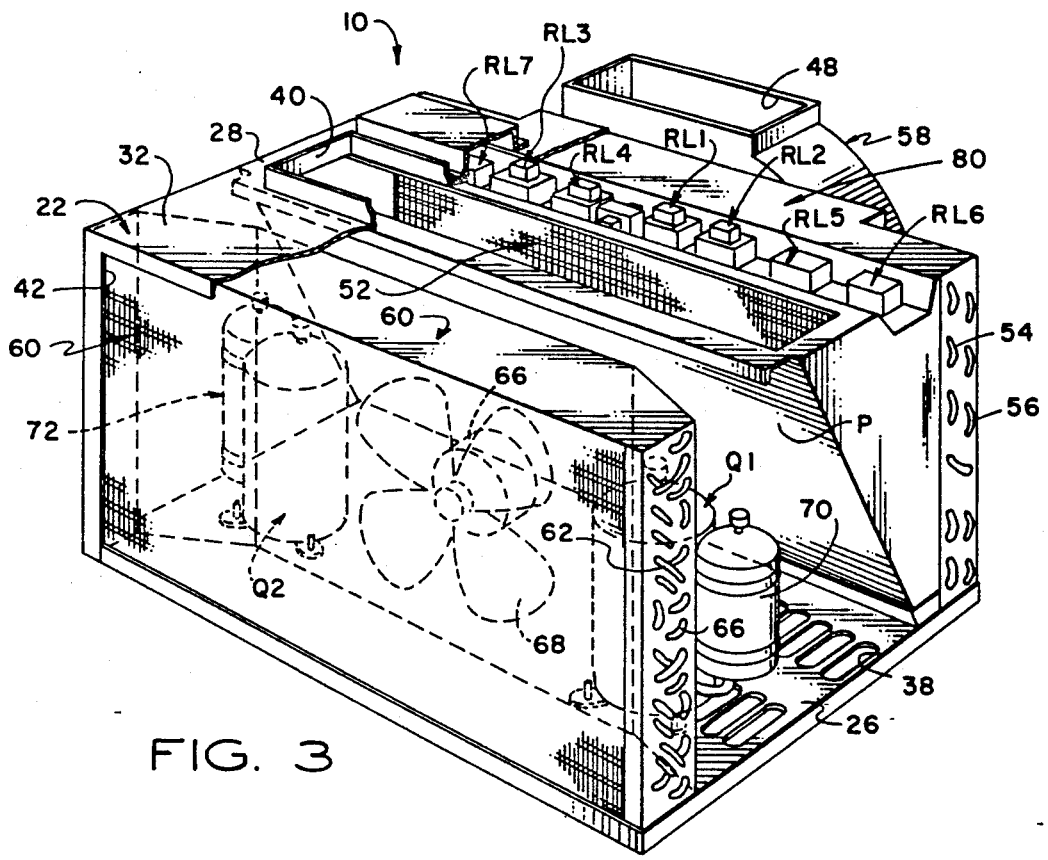
FIG. 3 is a perspective view of the dual stage air conditioning unit shown in FIG. 1, with the top panel partially broken away and one side panel completely removed.
FIG. 4 is a simplified refrigerant schematic diagram of the dual stage refrigeration system shown in FIG. 1; and, FIG. 5 is a simplified electrical diagram of a control circuit which automatically applies operating power to only one stage from an on-board generator, and to both stages from a remote utility outlet.

Referring now to FIG. 2 and FIG. 3, the components of the dual stage air conditioning unit 10 are assembled within a housing 22 which is mounted beneath the vehicle floor 14 on a support panel 24. The housing 22 includes a base panel 26, external side panels 28, 30 and a top panel 32. The housing panels are interconnected to form a condenser airflow passage 34 and an evaporator airflow passage 36, which are separated by an interior panel P. The base panel 26 has an opening 38 defining an inlet port which permits the intake of outside air A into the condenser airflow passage 34. The top panel 32 has an opening 40 defining a return air inlet port which permits the circulation of inside refrigerated air into the evaporator airflow passage 36. Preferably, the entrance to the return air inlet port 40 is covered by a return air filter F.

The housing 22 has a side opening 42 which is positioned in registration with a window opening 44 formed in the sidewall 46 of the recreational vehicle 16. According to this arrangement, outside ambient air can be circulated through the condenser airflow passage 34 and is discharged through the sidewall window opening 44 after absorbing heat from the condenser refrigerant.

The opposite end of the housing 22 has a side panel opening 48 coupled in airflow communication with the evaporator airflow passage 36, thereby defining a refrigerated air discharge port. The refrigerated air discharge port is coupled to a plenum 50 which supplies refrigerated air to the overhead duct 20 and the floor duct 18.

The return air R from the interior of the recreational vehicle 16 is circulated across an evaporator 52 which includes first and second interleaved evaporator refrigerant coils 54, 56 which are supported transversely across the evaporator airflow passage 36. According to this arrangement, the heat load carried by the return air R from the interior of the recreational vehicle 16 is absorbed by refrigerant vapor as it expands through the evaporator coils 54, 56. The circulation of return air through the evaporator airflow passage 36 is induced by a blower fan 58 having a squirrel cage impeller 59 which is interposed between the evaporator unit 52 and the refrigerated air discharge port 48.

The heat load absorbed by the refrigerant in the interleaved evaporator coils 54, 56 is rejected into the surrounding ambient outside air A by a condenser 60 which is mounted in registration with the housing side opening 42. The condenser 60 includes interleaved condenser coils 62, 64 which are supported transversely across the condenser airflow passage 34. A condenser fan 66 is mounted within the condenser airflow passage and has fan blades 68 for drawing outside air A through the inlet port 42. The fan blades 68 force the outside air A to flow in heat exchange contact across the interleaved condenser coils 62, 64.

Referring now to FIG. 3 and FIG. 4, a first stage compressor, compressor Q1, has a suction port S coupled in series refrigerant flow relation with the first evaporator coil 54, and has a discharge port D connected in series flow relation with the first condenser coil 62. Similarly, a second stage compressor, compressor Q2, has a suction port S coupled in series flow relation with the second evaporator coil 56, and has an outlet port D coupled in series flow relation with the second condenser coil 64. As the refrigerant condenses within the condenser coils 62, 64, it is collected within receivers 70, 72, respectively.

Each receiver 70, 72 is connected in series flow relation with the evaporator coils 54, 56, respectively, by expansion valves 74, 76, respectively. Each expansion valve functions as a throttling device to meter the flow of liquid refrigerant through the evaporator coils 54, 56. Each evaporator coil includes a series of bends or loops through which the refrigerant makes multiple passes through a finned core. The temperature and pressure of the refrigerant decreases as it is discharged through the expansion valve. The decreased pressure and temperature due to expansion, coupled with the heat transfer from the return air A, causes the refrigerant to evaporate. The vapor refrigerant flows to the suction side of each compressor Q1, Q2, where the vapor is compressed to continue the refrigeration cycle.

Referring again to FIG. 2 and FIG. 3, it will be seen that the principal components of the dual stage air conditioning system 10 are compactly organized within the housing enclosure 22. By interleaving the condenser coils 62, 64 about a common finned core 60C and by interleaving the evaporator coils 54, 56 about a common finned core 52C, a single heat exchanger fan 66 can be employed for circulating the ambient air across the condenser coils, and a single blower fan 58 can be employed to draw return air across the evaporator coils 54, 56.

The sloping partition panel P, which is centrally located between the evaporator flow passage and the condenser flow passage, produces an evaporator flow passage whose cross section area generally diverges from the return air inlet 40 to the transverse evaporator unit 52. Likewise, the cross section area of the condenser airflow passage 34 generally diverges from the outside airflow inlet 38 to the condenser 60. The diverging cross sectional areas of the evaporator flow passage and the condenser flow passage provide maximum airflow across the heat exchange surfaces of the condenser 60 and evaporator 52. The sloping partition panel P also makes possible the below floor level installation of the dual stage air conditioning unit, with the return air inlet and refrigerated air discharge outlet both oriented upwardly for engaging the floor duct coupling. This arrangement of components also permits the condenser to be mounted flush against the vehicle sidewall for exhausting the heat load away from the vehicle.

Figure 5:
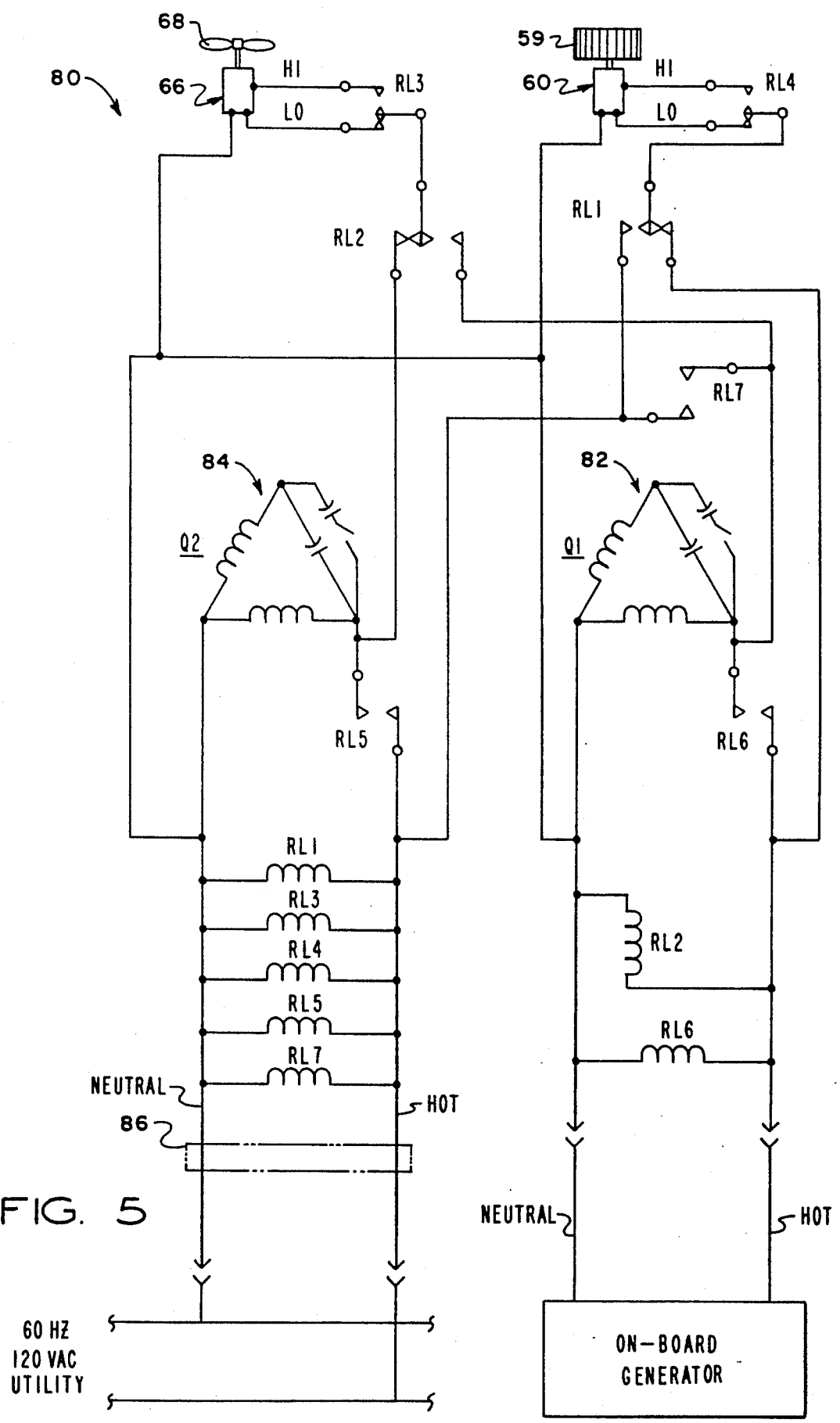

Referring now to FIG. 5, a control circuit 80 automatically applies operating power to the evaporator fan motor 60, the condenser fan motor 66, the capacitor start induction motor 82 of the first stage compressor Q1, and the capacitor start induction motor 84 of the second stage compressor Q2. According to one aspect of the invention, the control circuit 80 is operable to apply power only to the drive motor 82 of the first stage compressor Q1, the evaporator blower motor 60 and the condenser fan motor 66 when power is applied from an on-board generator. The control circuit 80 is also operable to automatically apply AC operating power to the evaporator fan motor 60, the condenser fan motor 66 and the drive motors 82, 84 of both compressors Q1, Q2 when operating power is applied from a utility outlet.

According to this arrangement, AC operating power produced by an on-board generator is automatically applied only to a single air conditioning stage by a first set of switching relays RL2 and RL6 which are energized only when the on-board generator power circuit is active. AC operating power derived from a utility outlet is automatically applied to both stages by a second set of switching relays RL1, RL3, RL4, RL5 and RL7, with operation of the first and second sets of switching relays being independent of each other.

Assuming that the recreational vehicle 16 is in transit, or that it is parked and that commercial utility power is not available, the on-board generator supplies single phase, 120 VAC, 60 Hz operating power to the drive motor 82 of the compressor Q1 and to the evaporator blower motor 60 and condenser fan motor 66. When on-board generator power is applied, relay RL2 and relay RL6 are energized. This causes the switch contacts of relay RL6 to close, thereby applying operating power to the drive motor 82 of compressor Q1. Operating power is applied to the evaporator blower motor 60 through the closed switch contacts of relay RL1 and the closed switch contacts of relay RL4, which is electrically connected to the low speed power input of the two speed induction motor 60. The operating current is returned through the neutral conductor to the on-board generator. In the single stage operating mode in which operating power is supplied only by the on-board generator, a conductive power path is not established for operating the second compressor Q2. Accordingly, the evaporator blower fan 59 and the condenser fan 68 are driven at low operating speeds for handling the refrigerant flow and heat load through a single set of condenser and evaporator coils 64, 52.

When the recreational vehicle 16 is parked and the power cable 86 is plugged into an AC power utility receptacle, relay RL2 and relay RL6 are de-energized, while relay RL1, RL3, RL4, RL5 and RL7 are energized, thereby applying hot operating current through the closed switch contacts of RL5 to the induction drive motor 84 of compressor Q2. Hot operating current is also applied to the high speed input of the evaporator blower motor 60 through the closed switch contacts of relay RL1 and relay RL4 with the current being returned through the neutral conductor. Operating current is likewise applied to the high speed input circuit of the condenser fan 66 through the closed switch contacts of relay RL2 and relay RL3. Simultaneously, hot operating current is applied to the input of the drive motor 82 of compressor Q1 through the closed switch contacts of relay RL7. Consequently, AC operating power derived from a utility outlet is automatically applied to both stages by the second set of switching relays, with the first set of switching relays being de-energized. The dual stage air conditioning system can be operated simply by turning off the on-board generator and plugging in the AC power cable 86 to a commercial utility outlet, thus providing increased cooling capacity when commercial utility power is available.

While in the foregoing specification a detailed description of a specific embodiment of the invention has been set forth for the purpose of illustration, it will be understood that many of the details given herein may be varied considerably by those skilled in the art without departing from the spirit and scope of the invention. The present invention is therefore intended to be limited only by the scope of appended claims and the applicable prior art.

What is claimed is:

1. A compact air conditioning unit for installation in a recreational vehicle comprising, in combination:

a housing including a base panel, external side panels, a top panel and an interior panel interconnected to form a condenser airflow passage and an evaporator airflow passage which are separated with respect to each other by said interior panel;

said base panel having an opening defining an outside airflow port in airflow communication with the condenser airflow passage;

said top panel having an opening defining a return air inlet port in airflow communication with the evaporator airflow passage;

said housing having a first side panel opening disposed in airflow communication with the condenser airflow passage thereby defining a condenser discharge air exhaust port;

said housing having a second side panel opening disposed in airflow communication with the evaporator airflow passage thereby defining a refrigerated air discharge port;

a refrigerant compressor, a condenser, a refrigerant expansion valve and an evaporator serially connected in a closed refrigeration circuit, said condenser being disposed across the condenser airflow passage, and said evaporator being disposed across the evaporator airflow passage;

said compressor and condenser fan being disposed within the condenser airflow passage; and, said evaporator fan being disposed within the evaporator airflow passage.

2. A dual stage air conditioning system for installation in a recreational vehicle of the type having an on-board AC power generator and a power cable for connection to an electrical utility power outlet, said dual stage air conditioning system comprising:

first and second refrigeration stages including first and second refrigerant compressors, first and second condensers, first and second refrigerant expansion valves and first and second evaporators;

said first compressor, first condenser, first refrigerant expansion valve and first evaporator being serially connected in a first refrigeration circuit;

said second compressor, second condenser, second refrigerant expansion valve and second evaporator being serially connected in a second refrigeration circuit;

a condenser fan for circulating outside air across the first and second condensers;

an evaporator fan for circulating interior air from the recreational vehicle across the first and second evaporators; and, a control circuit for automatically applying electrical operating power to the evaporator fan, the condenser fan and the compressor of only one refrigeration stage when power is applied from an on-board generator, and for automatically applying AC operating power to the evaporator fan, the condenser fan and the compressors of both refrigeration stages when operating power is applied from a utility outlet.

3. A dual stage air conditioning system as defined in claim 2, wherein said control circuit includes first and second relay switches having actuating coils connected across the electrical power output conductors of the on-board generator and having first and second switch elements for applying AC operating power to the first compressor and for applying AC operating power to one of the condenser and evaporator fans, and third and fourth relay switches having actuating coils connected across the utility power cable conductors for receiving operating power from a utility outlet, said third and fourth relay switches having switch elements connected in series with the second compressor and with the evaporator blower fan.

4. A compact air conditioning unit for installation in a recreational vehicle comprising, in combination:

a housing including a base panel, external side panels, a top panel and an interior panel interconnected to form a condenser airflow passage and an evaporator airflow passage;

said base panel having an opening defining an outside airflow port in airflow communication with the condenser airflow passage;

said top panel having an opening defining a return air inlet port in airflow communication with the evaporator airflow passage;

said housing having a first side panel opening disposed in airflow communication with the condenser heat exchange airflow passage thereby defining a condenser discharge air exhaust port;

said housing having a second side panel opening disposed in airflow communication with the evaporator airflow passage thereby defining a refrigerated air discharge port;

a refrigerator compressor, a condenser, a refrigerant expansion valve and an evaporator serially connected in a closed refrigeration circuit, said condenser being disposed across the condenser airflow passage, and said evaporator being disposed across the evaporator airflow passage;

said compressor and condenser fan being disposed within the condenser airflow passage;

said evaporator fan being disposed within the evaporator airflow passage; and, the condenser airflow passage and evaporator airflow passage being separated with respect to each other by said interior panel, said interior panel sloping transversely with respect to said condenser and said evaporator.

5. In a recreational vehicle of the type having an interior living space to be cooled by circulation of refrigerated air through a distribution duct and having an on-board AC power generator and a power cable connectable to an external utility power outlet for supplying electrical operating power to an on-board air conditioning system, the improvement comprising:

a dual stage air conditioning unit mounted below the floor of the recreational vehicle adjacent to a sidewall of the vehicle;

a control circuit connecting the on-board AC generator and the utility power cable to the dual stage air conditioning unit;

said dual stage air conditioning unit being enclosed within a housing including a base panel, external side panels, a top panel and an interior panel interconnected to form a condenser airflow passage and an evaporator airflow passage which are separated with respect to each other by said interior panel;

said base panel having an opening defining an outside air inlet port in airflow communication with the condenser airflow passage and connecting the condenser passage in airflow communication with outside ambient air;

said top panel having an opening defining a return air inlet port through the vehicle floor in airflow communication with the evaporator airflow passage and connecting the evaporator passage in airflow communication with the interior living space of the vehicle;

said housing having a first side panel opening disposed in airflow communication with the condenser airflow passage and connecting the condenser passage in airflow communication with outside ambient air through the vehicle sidewall;

said housing having a second side panel opening disposed in airflow communication with the evaporator airflow passage and connecting the evaporator passage in airflow communication with the refrigerated air distribution duct and the interior living space of the vehicle through the vehicle floor;

a condenser unit including first and second interleaved condenser coils disposed across the condenser airflow passage;

an evaporator unit including first and second interleaved evaporator coils disposed across the evaporator airflow passage;

a first compressor having a suction port coupled in series flow relation with the first evaporator coil, and having an outlet port connected in series flow relation with the first condenser coil;

a second compressor having a suction port coupled in series flow relation with the second evaporator coil, and having an outlet port connected in series flow relation with the second condenser coil;

a first refrigerant expansion valve coupled in series flow relation between the outlet of the first condenser coil and the inlet of the first evaporator coil;

a second refrigerant expansion valve coupled in series flow relation between the outlet of the first condenser coil and the inlet of the first evaporator coil;

a condenser fan disposed within the condenser airflow passage for drawing outside air through the inlet port and forcing it to flow in heat exchange contact across the interleaved condenser coils;

an evaporator fan disposed within the evaporator airflow passage for drawing air from the interior living space of the recreational vehicle through the return air inlet port and causing it to flow in heat exchange contact across the interleaved evaporator coils and through the refrigerated air distribution duct; and, said control circuit including switching apparatus for automatically applying electrical operating power to the evaporator fan, the condenser fan and the compressor of only one stage when power is supplied by said on-board generator, and for automatically applying AC operating power to the evaporator fan, the condenser fan and the compressors of both stages when operating power is supplied by an external utility outlet.

* * * * *